May 8, 1962
W. G. MARTIN
3,033,730
METHOD OF FORMING A PRESTRESSED ARTICLE
OF FIBER REINFORCED RESIN
Filed Nov. 7, 1956
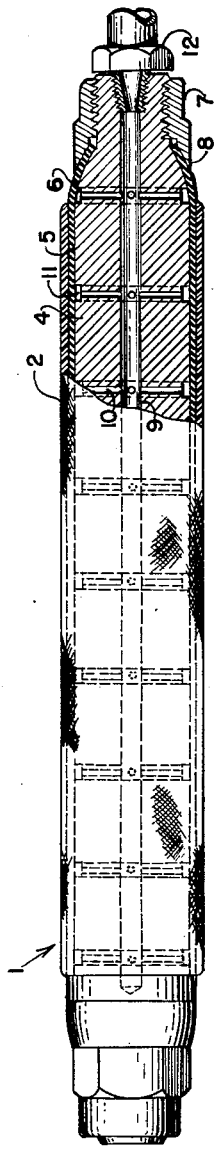
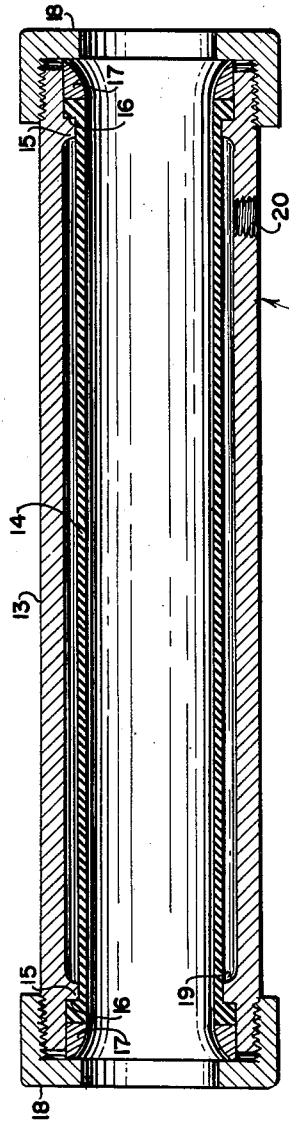
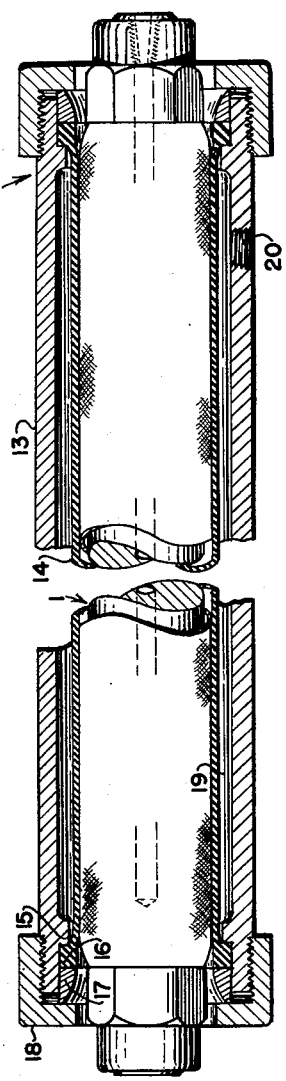
INVENTOR.
WESLEY G. MARTIN
BY Andrus + Scales
Attorneys

United States Patent Office 3,033,730
Patented May 8, 1962

3,033,730
METHOD OF FORMING A PRESTRESSED ARTICLE OF FIBER REINFORCED RESIN
Wesley G. Martin, Milwaukee, Wis., assignor to A. O. Smith Corporation, Milwaukee, Wis., a corporation of New York
Filed Nov. 7, 1956, Ser. No. 620,911
2 Claims. (Cl. 156—161)

This invention relates to fiber reinforced resin articles, such as pipe, and more particularly to a method of curing the same.

Thermosetting resin articles are frequently reinforced by fibrous material, such as glass, to increase the mechanical properties of the article. In the manufacture of tubular articles, such as pipe, fiber strands are coated or otherwise impregnated with liquid uncured resin and the fiber strands are wound in a generally helical patern on a mandrel to form the tubular article. After winding the resin is cured to form an integrally bonded structure.

Many of the resins employed in laminates of this type have fairly high rates of shrinkage during the curing or polymerization phase of processing. If the reinforcing fibers in the laminate are under little or no tension during the curing operation, the cured laminate will have the fibers in compression and the resin in some tension under "no load" conditions. This condition is the opposite of that which would be desired for a laminate being made to withstand tensile stresses.

The present invention is directed to a method of curing a fiber reinforced resin laminate, such as a pipe section, so as to pre-stress the fiber reinforcement during the curing cycle and thereby produce a cured laminate in which the tensile stress of the fibers generally balances the compressive stress in the resin.

According to the invention, resin impregnated fibrous strands are wound in a generally helical pattern on an expandable cylindrical mandrel to form the pipe section. After winding, the mandrel is expanded radially outward to put the helical strand under tension. With the strand under tension, a second external force is applied to the outer surface of the pipe section which is of a lesser magnitude than the internal force. While the pipe section is thus subjected to both internal and external pressure, the resin is polymerized to form an integrally bonded structure in which the tensile stress of the fibers balances the compressive stress in the resin.

Other objects and advantages will appear in the course of the following description.

The drawings illustrate the best mode presently contemplated of carrying out the invention.

In the drawings:

FIGURE 1 is a side elevation of a mandrel, with parts broken away and sectioned, on which the pipe section is fabricated;

FIG. 2 is an end view of the mandrel of FIGURE 1 with parts broken away and sectioned;

FIG. 3 is a longitudinal section of the external die member; and

FIG. 4 is a longitudinal section of the assembly of the mandrel and external die member during curing of the resin pipe section.

The drawings illustrate an apparatus for curing a fiber reinforced resin article comprising a mandrel 1, on which the pipe section 2 is fabricated, and an outer die member 3 which is adapted to receive the mandrel and pipe section during curing of the resin.

Mandrel 1 has a generally cylindrical shape and includes a core 4 which is covered with a flexible sleeve 5 made of rubber, plastic, synthetic material or the like. Sleeve 5 is tightly disposed on the outer surface of the mandrel core, and the ends of the sleeve are secured to the corresponding tapered end surfaces 6 of the mandrel core by ring clamps 7. The clamps 7 are threadedly engaged with the ends of core 4 and the inner annular flange 8 of each clamp secures the sleeve 5 tightly to the surfaces 6.

The pipe section 2 is fabricated on the mandrel by winding a fibrous material, such as long reinforcing fibers, or fiber strands, roving, yarn or the like, which are suitably impregnated with a liquid uncured thermosetting resin, in a helical or circumferential pattern.

The fibers may take the form of synthetic, mineral, vegetable or animal fibers such as glass, asbestos, rayon, cotton, or the like.

The resin may take the form of any of the conventional thermosetting resins. For example, the resin may be a thermosetting polyester resin such as a polyester resin in which at least one of the reactants contains an unsaturated double bond in an aliphatic group. For example, the unsaturated bond may be in the polybasic acid component such as when maleic acid or anhydride is reacted with a polyhydric alcohol such as glycerol, ethylene glycol, diethylene glycol, propylene glycol, sorbitol, mannitol, pentaerythritol, polyethylene glycol and the like. In addition, thermosetting resins of the diallylphthalate, epoxide, furane, phenolic, melamine and vinyl types may be also employed as the resin.

The sleeve 5 is expanded outwardly from the mandrel core to pre-stress the helical wound reinforcement by introducing fluid pressure between the sleeve and outer surface of the mandrel core 4. This is accomplished by providing the core 4 with a central longitudinal opening 9 and a series of radially extending passages 10 which communicate with the opening 9. The radial passages communicate with circumferential grooves 11 formed in the outer surface of the mandrel core. In addition, the grooves 11 may be connected by longitudinal grooves, not shown.

A fluid under pressure, such as air or oil, is introduced into opening 9 by means of a fitting 12 which is threadedly engaged within the open end of opening 9. The fluid introduced within the mandrel core exerts a pressure against the sleeve 5 forcing the same outwardly to expand the reinforcement radially and put the winding under tension.

Expanding the sleeve 5 outwardly to put the helical wound reinforcement under tension serves to prestress the reinforcement. By maintaining this prestressed condition during the curing of the resin, the compressive stress resulting from the shrinkage of the resin is balanced by the pre-stress initially applied to the reinforcement so that the reinforcement is not under compression in the furnished article under "no load" conditions.

To drive the entrapped air in the resin outwardly and improve the physical properties of the article, pressure is applied to the outer surface of the pipe section 2. The external pressure is applied through outer die member 3 which is disposed around the mandrel 1 during the curing of the pipe section 2.

The die member 3 includes a generally cylindrical tube 13 and a flexible liner 14 disposed on the inner surface of the tube. The liner 14 is fabricated of a flexible resilient material such as plastic, rubber or the like.

To secure the flexible liner 14 within the tube 13, the tube is provided with an internal shoulder 15 and the peripheral flange 16 of liner 14 is clamped against the shoulder 15 by a clamping ring 17. The clamping ring 17 is forced inwardly against the flange of the liner 14 by end caps 18 which are threadedly engaged with the ends of the tube 13.

A fluid under pressure such as air, oil or the like is introduced into the clearance 19 between the tube 13 and liner 14 through an opening 20 formed in the tube 13.

In operation of the present invention, the fibrous material is initially wound on the mandrel 1 in a generally helical pattern to form the pipe section 2. The fibers are impregnated with the liquid uncured resin by any suitable means such as spraying, dipping, brushing or the like.

After the pipe section 2 has been wound on the mandrel 1, the sleeve 5 is expanded outwardly by introducing fluid under pressure into the axial opening 9. Outward movement of the sleeve 5 puts the fiber reinforcement in tension and provides a pre-stress for the fibers.

While the fiber reinforcement is in this pre-stressed condition, air or other fluid is introduced into the clearance 19 in die member 3 to force the liner 14 inwardly against the pipe section 2. Both the internal and external pressures are maintained on the pipe section 2 during curing of the resin. The resin cure may be accelerated by the application of heat, if desired.

In order to maintain the pre-stressed condition on the fibers during the curing operation, the internal pressure applied to the sleeve 5 should be of a greater magnitude than the external pressure applied to the liner 14. By proper regulation of the pressure in the mandrel and simultaneous regulation of the pressure exerted through the die member 3 it is possible to achieve both pre-stressing of the fibers and pressure on the laminate or resin at the same time to provide a resin article having superior physical properties. The particular pressure ranges involved are determined by the chemical and physical characteristics of the resin employed. Pressures as low as 15 to 20 pounds per square inch may be employed for the curing of some resins while with other resins it may be necessary to use pressure in the range of 2000 p.s.i. or higher to get the optimum results.

While the above description is directed to the internal pressure being applied first, it is contemplated that under certain conditions it may be desired to apply both internal and external pressures simultaneously or to apply the external pressure first.

A pipe section is generally manufactured with the internal diameter having a given tolerance. With the present method of curing, the expansion of the mandrel can be controlled to provide the pipe section with the desired predetermined internal diameter and the subsequent application of external pressure will not affect the controlled internal diameter. If however, the pipe section were to be expanded outwardly against a fixed die, which would be similar to applying external pressure, the external diameter of the pipe section would be controlling. To provide the pipe section with a pre-determined internal diameter when using a fixed external die, the amount of fiber material and resin used would be critical; the tension of winding of the fibers would have to be carefully controlled; and the viscosity of the resin would be a prime factor. However, these problems are eliminated with the present invention in which both internal and external pressures are applied to the pipe section, with the internal pressure being of a predetermined magnitude to provide the cured pipe section with a given internal diameter.

Various modes of carrying out the invention are contemplated as being within the scope of the following claims particularly pointing out and distinctly claiming the subject matter which is regarded as the invention.

I claim:

1. A method of curing a tubular member composed of long reinforcing fibers disposed circumferentially and impregnated with a liquid uncured thermosetting resin, which comprises, applying an internal fluid pressure through a flexible sleeve against the inner surface of said member of sufficient magnitude to place the fibers under tension while maintaining said member free of external confinement, applying an external fluid pressure through a second flexible sleeve against the outer surface of the member with said external pressure being of a lesser magnitude than said internal pressure, and thereafter curing the resin while maintaining both said internal and external pressures on said member to form an integrally bonded structure in which the tensile stress in the fibers generally balances the compressive stress in the cured resin.

2. A method of fabricating a fiber reinforced resin tubular member, comprising winding a fibrous strand on a flexible sleeve in a substantially helical pattern while coating the strand with an unpolymerized resin to form a tubular member of given thickness, introducing pressure within the sleeve to expand the tubular member to a given internal diameter and place the strand under tension while maintaining said member free of external confinement and substantially maintaining said given thickness, applying a positive pressure of lesser magnitude than said first named pressure on the outer surface of the tubular member to reduce said thickness while maintaining said given internal diameter to thereby drive entrapped air from said tubular member, and polymerizing the resin while maintaining said pressures on said member to maintain the strands under tension during polymerization.

References Cited in the file of this patent

UNITED STATES PATENTS

| | | |
|---|---|---|
| 1,721,253 | Loughead et al. | July 16, 1929 |
| 2,013,684 | Capella-Dalman | Sept. 10, 1935 |
| 2,082,715 | Nadai | June 1, 1937 |
| 2,296,781 | Farny | Sept. 22, 1942 |
| 2,467,999 | Stephens | Apr. 19, 1949 |
| 2,594,838 | Alexander et al. | Apr. 29, 1952 |
| 2,744,043 | Ramberg | May 1, 1956 |
| 2,766,160 | Bentov | Oct. 9, 1956 |
| 2,768,920 | Stout | Oct. 30, 1956 |
| 2,791,241 | Reed | May 7, 1957 |
| 2,808,354 | Peters | Oct. 1, 1957 |
| 2,826,784 | Pratt | Mar. 18, 1958 |
| 2,830,622 | Roberts et al. | Apr. 15, 1958 |
| 2,838,796 | Reed | June 17, 1958 |